US009465456B2

(12) United States Patent
Pant et al.

(10) Patent No.: US 9,465,456 B2
(45) Date of Patent: Oct. 11, 2016

(54) REDUCE STYLUS TIP WOBBLE WHEN COUPLED TO CAPACITIVE SENSOR

(71) Applicant: Apple Inc., Cupertino, CA (US)

(72) Inventors: Vivek Pant, San Jose, CA (US); Shahrooz Shahparnia, Campbell, CA (US); John Greer Elias, Townsend (DE)

(73) Assignee: Apple Inc., Cupertino, CA (US)

( * ) Notice: Subject to any disclaimer, the term of this patent is extended or adjusted under 35 U.S.C. 154(b) by 67 days.

(21) Appl. No.: 14/283,105

(22) Filed: May 20, 2014

(65) Prior Publication Data

US 2015/0338932 A1 Nov. 26, 2015

(51) Int. Cl.
*G06F 3/0354* (2013.01)
*G06F 3/0488* (2013.01)
*G06F 3/041* (2006.01)
(Continued)

(52) U.S. Cl.
CPC .......... *G06F 3/03545* (2013.01); *G06F 3/038* (2013.01); *G06F 3/044* (2013.01); *G06F 3/0418* (2013.01); *G06F 3/0488* (2013.01)

(58) Field of Classification Search
CPC .. G06F 3/03545; G06F 3/044; G06F 3/0416; G06F 3/038; G06F 3/0386; G06F 3/0383; G06F 3/03547; G06F 3/041; G06F 3/047; G06F 3/0414; G06F 3/046; G06F 3/0317; G06F 2203/041; G06F 2203/04107; G06F 2203/04111; G06F 2203/04112; G06F 2203/04113; G06F 2203/04101
USPC ......................................... 345/173–176, 179
See application file for complete search history.

(56) References Cited

U.S. PATENT DOCUMENTS

| 5,198,623 | A | * | 3/1993 | Landmeier | ............. G06F 3/046 178/18.02 |
| 5,483,261 | A | | 1/1996 | Yasutake | |
| 5,488,204 | A | | 1/1996 | Mead et al. | |

(Continued)

FOREIGN PATENT DOCUMENTS

| JP | 2000-163031 A | 6/2000 |
| JP | 2002-342033 A | 11/2002 |
| WO | WO-2014/168779 A1 | 10/2014 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — Larry Sternbane
(74) *Attorney, Agent, or Firm* — Morrison & Foerster LLP

(57) ABSTRACT

Algorithms can be used to reduce stylus tip wobble for a stylus translating on a surface over and between electrodes of a touch sensor panel. In some examples, a first position estimate can be calculated using a first position calculation method and a second position estimate can be calculated using a second position calculation method. The position of the stylus can be determined based on a weighted combination of the first and second position estimates. In some examples, the first position estimate can be calculated using an even-point centroid of signal contributions from an even number of electrodes of a touch sensor panel and the second position estimate can be calculated using an odd-point centroid of signal contributions from an odd number of electrodes. In some examples, the weighting can be assigned based on a ratio of the two largest amplitude signals and based on a ratio of the second and third largest amplitude signals.

20 Claims, 9 Drawing Sheets

(51) Int. Cl.
*G06F 3/044* (2006.01)
*G06F 3/038* (2013.01)

(56) References Cited

U.S. PATENT DOCUMENTS

| | | | |
|---|---|---|---|
| 5,825,352 A | 10/1998 | Bisset et al. | |
| 5,835,079 A | 11/1998 | Shieh | |
| 5,880,411 A | 3/1999 | Gillespie et al. | |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,690,387 B2 | 2/2004 | Zimmerman et al. | |
| 7,015,894 B2 | 3/2006 | Morohoshi | |
| 7,184,064 B2 | 2/2007 | Zimmerman et al. | |
| 7,663,607 B2 | 2/2010 | Hotelling et al. | |
| 8,477,106 B2 | 7/2013 | Salaverry et al. | |
| 8,479,122 B2 | 7/2013 | Hotelling et al. | |
| 8,482,536 B1 | 7/2013 | Young | |
| 9,134,836 B2* | 9/2015 | Takano | G06F 3/041 |
| 2006/0197753 A1 | 9/2006 | Hotelling | |
| 2008/0100586 A1 | 5/2008 | Smart | |
| 2010/0097329 A1 | 4/2010 | Simmons et al. | |
| 2011/0025638 A1* | 2/2011 | Salaverry | G06F 3/044 345/174 |
| 2011/0096003 A1* | 4/2011 | Hill | G06F 3/044 345/173 |
| 2012/0075243 A1* | 3/2012 | Doi | G06F 3/044 345/174 |
| 2012/0200530 A1 | 8/2012 | Wu et al. | |
| 2012/0327041 A1* | 12/2012 | Harley | G06F 3/03545 345/179 |
| 2013/0257807 A1 | 10/2013 | Harris et al. | |
| 2013/0278550 A1* | 10/2013 | Westhues | G06F 3/03545 345/174 |
| 2013/0342468 A1 | 12/2013 | Hekstra | |

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

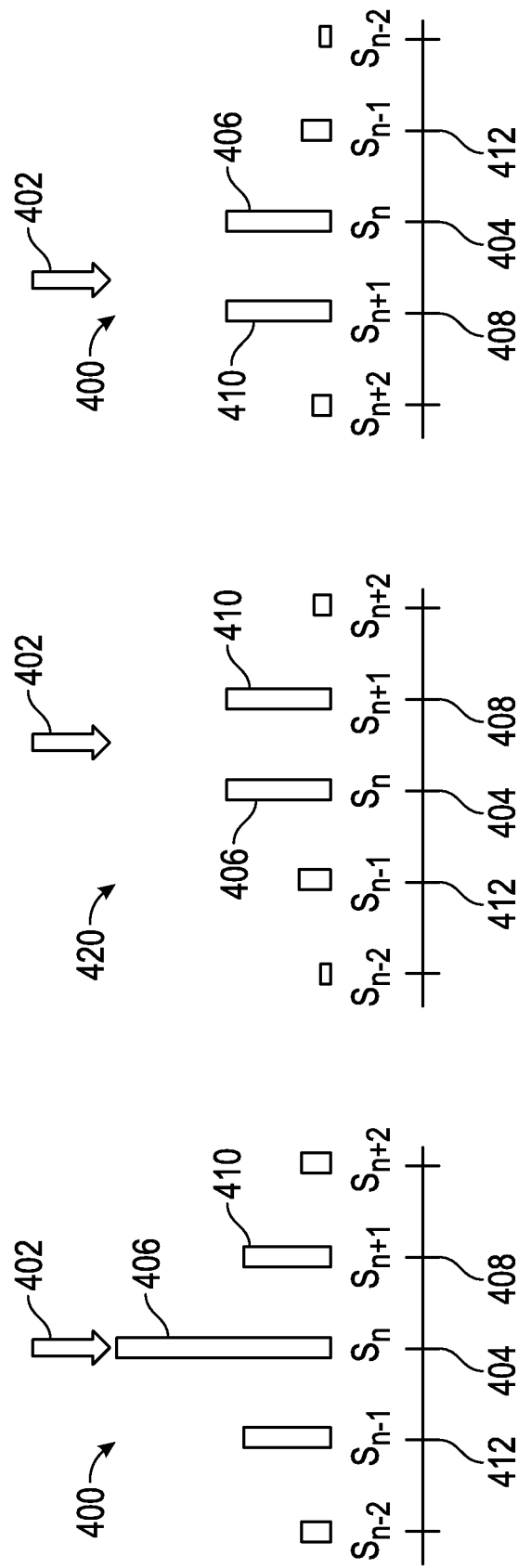

REDUCE STYLUS TIP WOBBLE WHEN COUPLED TO CAPACITIVE SENSOR

FIELD OF THE DISCLOSURE

This relates to touch sensor panels used as input devices for computing systems, and more particularly, to techniques for reducing stylus tip wobble when coupled to a touch sensor panel.

BACKGROUND OF THE DISCLOSURE

Touch sensitive devices have become popular as input devices to computing systems due to their ease and versatility of operation as well as their declining price. A touch sensitive device can include a touch sensor panel, which can be a clear panel with a touch sensitive surface, and a display device, such as a liquid crystal display (LCD), that can be positioned partially or fully behind the panel or integrated with the panel so that the touch sensitive surface can cover at least a portion of the viewable area of the display device. The touch sensitive device can allow a user to perform various functions by touching the touch sensor panel using a finger, stylus, or other object at a location often dictated by a user interface (UI) being displayed by the display device. In general, the touch sensitive device can recognize a touch event and the position of the touch event on the touch sensor panel, and the computing system can then interpret the touch event in accordance with the display appearing at the time of the touch event, and thereafter can perform one or more actions based on the touch event.

As touch sensing technology continues to improve, touch sensitive devices are increasingly being used to compose and mark-up electronic documents. In particular, styli have become popular input devices as they emulate the feel of traditional writing instruments. The effectiveness of a stylus, however, can depend on the ability to accurately calculate the position of the stylus on a touch sensor panel.

SUMMARY OF THE DISCLOSURE

This relates to an algorithm for reducing stylus tip wobble for a stylus translating on a surface over and between electrodes of a touch sensor panel. In some examples, a first position estimate can be calculated using a first position calculation method and a second position estimate can be calculated using a second position calculation method. The position of the stylus can be determined based on a weighted combination of the first and second position estimates. In some examples, the first position estimate can be calculated using an even-point centroid of signal contributions from an even number of electrodes of a touch sensor panel and the second position estimate can be calculated using an odd-point centroid of signal contributions from an odd number of electrodes. In some examples, the weighting can be assigned based on a ratio of the two largest amplitude signals and based on a ratio of the second and third largest amplitude signals.

BRIEF DESCRIPTION OF THE DRAWINGS

FIGS. 4A-4C illustrate exemplary signal profiles for a stylus proximate to a touch sensor panel according to examples of the disclosure.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

This relates to an algorithm for reducing stylus tip wobble for a stylus translating on a surface over and between electrodes of a touch sensor panel. In some examples, a first position estimate can be calculated using a first position calculation method and a second position estimate can be calculated using a second position calculation method. The position of the stylus can be determined based on a weighted combination of the first and second position estimates. In some examples, the first position estimate can be calculated using an even-point centroid of signal contributions from an even number of electrodes of a touch sensor panel and the second position estimate can be calculated using an odd-point centroid of signal contributions from an odd number of electrodes. In some examples, the weighting can be assigned based on a ratio of the two largest amplitude signals and based on a ratio of the second and third largest amplitude signals.

Figure 1:
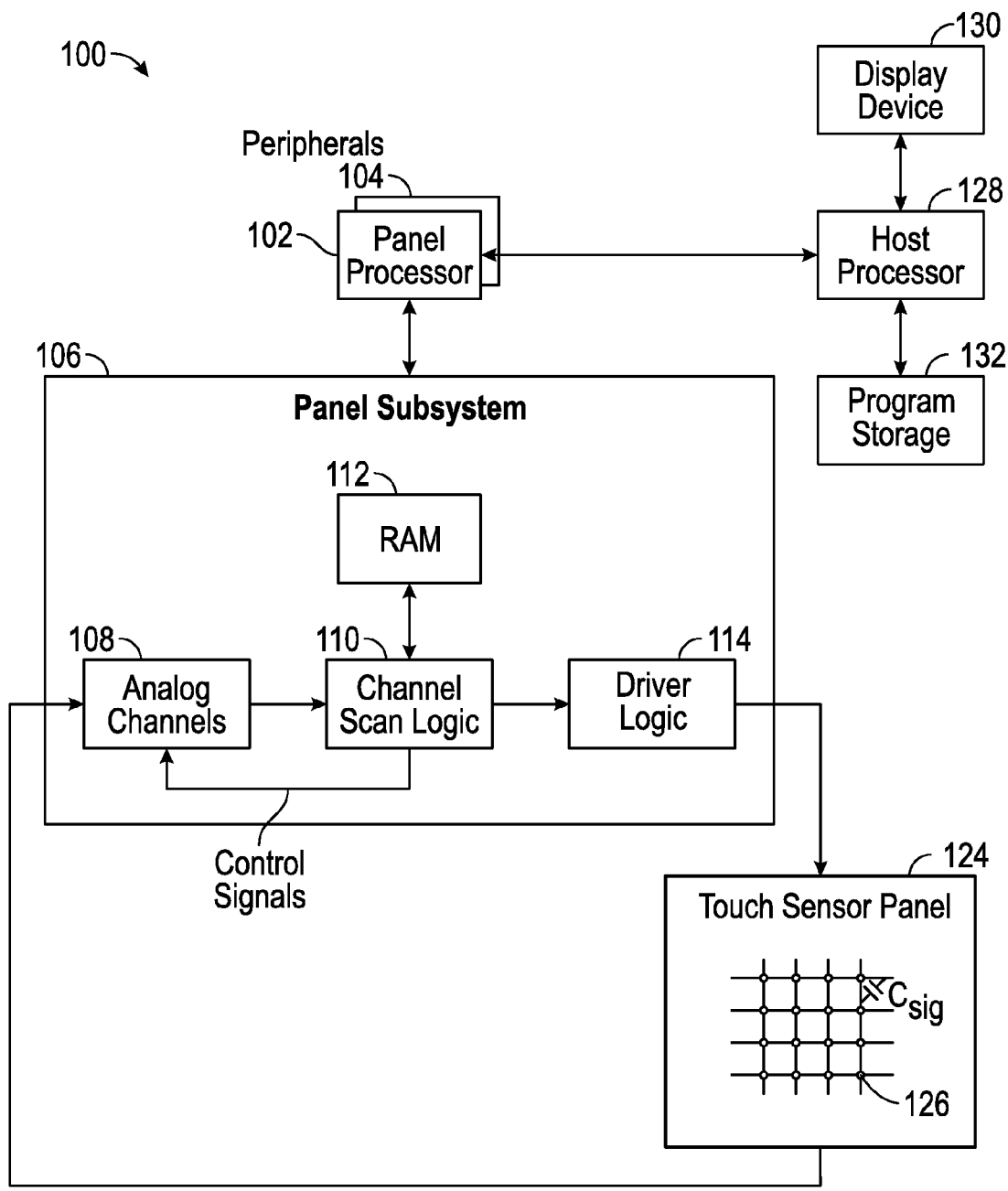
FIG. 1 illustrates an exemplary computing system capable of reducing stylus tip wobble according to examples of the disclosure.

FIG. 1 illustrates an exemplary computing system capable of reducing stylus tip wobble according to examples of the disclosure. Computing system 100 can include one or more panel processors 102, which can execute software or firmware implementing the algorithm for reducing stylus tip wobble according to examples of the disclosure, peripherals 104, and panel subsystem 106. Peripherals 104 can include, but are not limited to, random access memory (RAM) or other types of memory or storage, watchdog timers and the like. Panel subsystem 106 can include, but is not limited to, one or more sense channels 108, channel scan logic (analog or digital) 110 and driver logic (analog or digital) 114. Channel scan logic 110 can access RAM 112, autonomously read data from sense channels 108 and provide control for the sense channels. In addition, channel scan logic 110 can control driver logic 114 to generate stimulation signals 116 at various phases that can be simultaneously applied to drive lines of touch sensor panel 124. In some examples, panel subsystem 106, panel processor 102 and peripherals 104 can be integrated into a single application specific integrated circuit (ASIC).

Touch sensor panel 124 can include a capacitive sensing medium having a plurality of drive lines and a plurality of sense lines, although other sensing media can also be used. The drive and sense lines can be formed from a transparent conductive medium such as Indium Tin Oxide (ITO) or Antimony Tin Oxide (ATO), although other transparent and non-transparent materials such as copper can also be used. The drive and sense lines can be formed on a single side of a substantially transparent substrate, on opposite sides of the substrate, or on two separate substrates separated by the dielectric material. Each intersection of drive and sense lines can represent a capacitive sensing node and can be viewed as picture element (pixel) 126, which can be particularly useful when touch sensor panel 124 is viewed as capturing an "image" of touch. (In other words, after panel subsystem 106 has determined whether a touch event has been detected at each touch sensor in the touch sensor panel, the pattern of touch sensors in the multi-touch panel at which a touch event occurred can be viewed as an "image" of touch (e.g., a pattern of fingers touching the panel).) The capacitance between the drive and sense lines and local system ground can appear as a stray capacitance Cstray and the capacitance at the intersections of the drive and sense lines, i.e., the touch nodes, as a mutual signal capacitance Csig when the given drive line is stimulated with an alternating current (AC) signal. The presence of a finger or other object near or on the touch sensor panel can be detected by measuring changes to a signal charge present at the nodes being touched, which can be a function of Csig. Each sense line of touch sensor panel 124 can drive sense channel 108 in panel subsystem 106. Touch sensor panel 124 can cover a portion or substantially all of a surface of a device.

Computing system 100 can also include host processor 128 for receiving outputs from panel processor 102 and performing actions based on the outputs that can include, but are not limited to, moving one or more objects such as a cursor or pointer, scrolling or panning, adjusting control settings, opening a file or document, viewing a menu, making a selection, executing instructions, operating a peripheral device coupled to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 128 can execute software or firmware implementing the algorithm for reducing stylus tip wobble when coupled to the touch sensor panel. Host processor 128 can also perform additional functions that may not be related to panel processing, and can be coupled to program storage 132 and display device 130 such as an LCD display for providing a UI to a user of the device. Display device 130 together with touch sensor panel 124, when located partially or entirely under the touch sensor panel, can form a touch screen.

Note that one or more of the functions described above can be performed by firmware stored in memory (e.g. one of the peripherals 104 in FIG. 1) and executed by panel processor 102, or stored in program storage 132 and executed by host processor 128. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding a signal) that can contain or store the program for use by or in connection with the instruction execution system, apparatus, or device. The non-transitory computer readable medium storage can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

Figure 2:
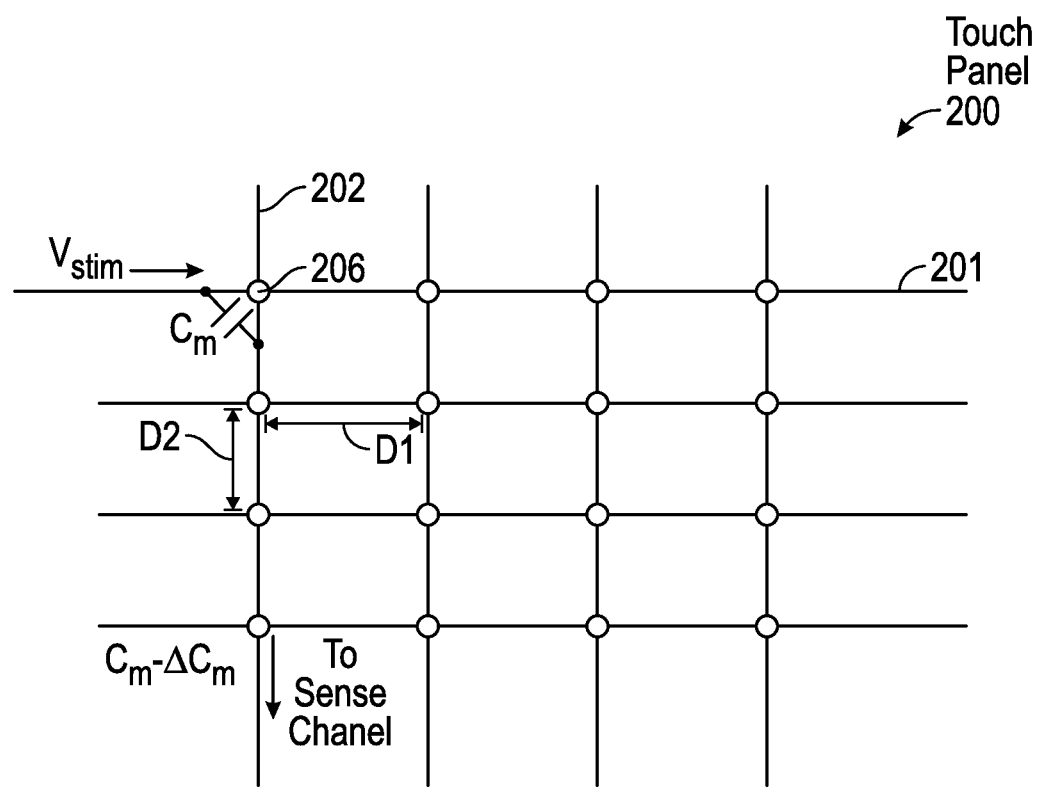
FIG. 2 illustrates an exemplary mutual capacitance touch sensor panel that can be used to detect touch or hover (proximity) events of an object according to examples of the disclosure.

FIG. 2 illustrates an exemplary mutual capacitance touch sensor panel that can be used to detect touch or hover (proximity) events of an object according to examples of the disclosure. In the example of FIG. 2, touch sensor panel 200 can include an array of touch nodes 206 formed at the crossing points of drive lines 201 and sense lines 202, although as discussed above, it should be understood that other touch node configurations can be used. During a mutual capacitance scan, one or more drive lines 201 can be stimulated to drive the touch sensor panel 200. Touch nodes 206 can have a mutual capacitance Cm at the touch nodes 206 when there is no object touching or hovering over touch nodes 206. When an object touches or hovers over the touch node 206 (e.g. a finger or a stylus), the mutual capacitance Cm can be reduced by $\Delta$Cm, i.e., (Cm−$\Delta$Cm), corresponding to the amount of charge shunted through the object to ground. This mutual capacitance change can be sensed by sense channels 108 and can be used to detect a touch or hover event and its location. Although described and illustrated as a mutual capacitance touch sensor panel, the touch sensor panel 124 can be configured in other ways. For example, touch sensor panel 124 can be configured to detect self-capacitance.

Referring to FIG. 2, the distance between each adjacent touch node in the same row can be a fixed distance D1. This fixed distance D1 can be referred to as the pitch for column electrodes. The distance between each adjacent touch node in the same column can be a fixed distance D2. This fixed distance D2 can be referred to as the pitch for row electrodes. In some examples, the pitch for row electrodes and column electrodes can be the same, but in other examples, D1 and D2 can be different.

Ideally, as an object such as a stylus traverses between two touch nodes, the actual position of the stylus on the touch screen and the calculated position of the stylus should be the same. In reality, based on the type of algorithm used to calculate position and the nature of the coupling between the stylus and the touch sensor panel, the actual and calculated positions can be different. For example, the position of a stylus on a touch sensor panel can be calculated by computing a weighted centroid defined in equation (1):

$$x_{calc} = \frac{\sum_{i=-N}^{N} x_i S_i}{\sum_{i=-N}^{N} S_i} \quad (1)$$

where $x_{calc}$ can be the calculated position along the x-axis, $S_i$ can be the signal measured at the $i^{th}$ electrode along the x-axis, and $x_i$ can be the position of the $i^{th}$ electrode along the x-axis.

Figure 3B:
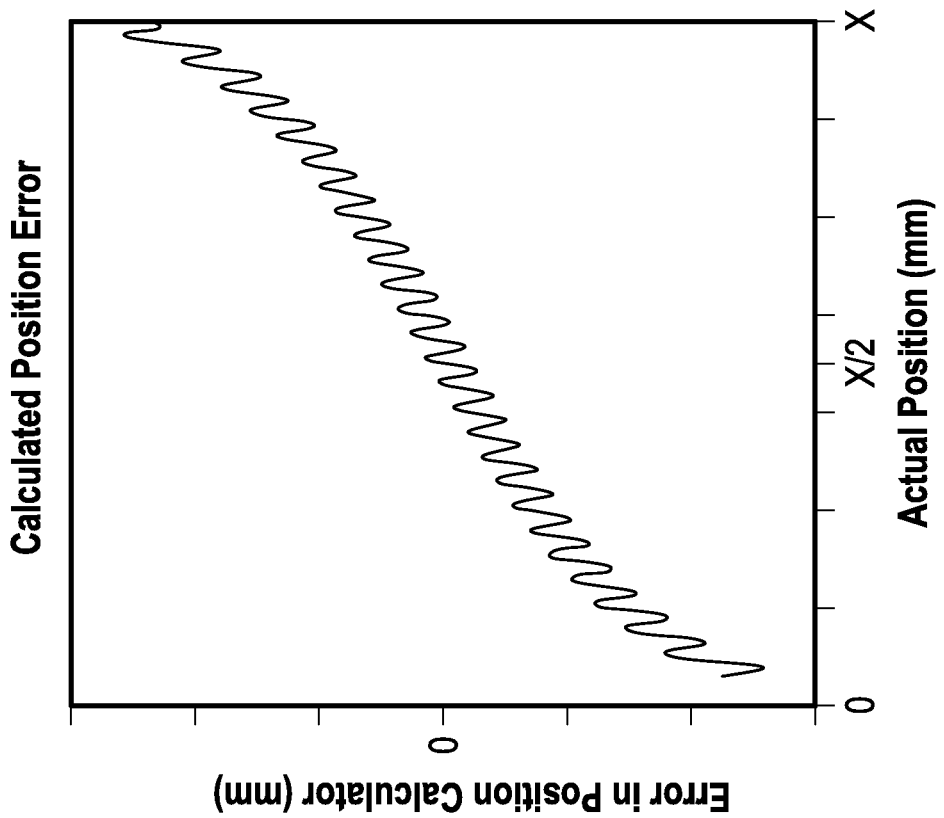
FIGS. 3A-3D illustrate examples of the disparity between actual position and calculated position as a stylus moves along one axis of a touch sensor panel according to examples of the disclosure.
Figure 3A:
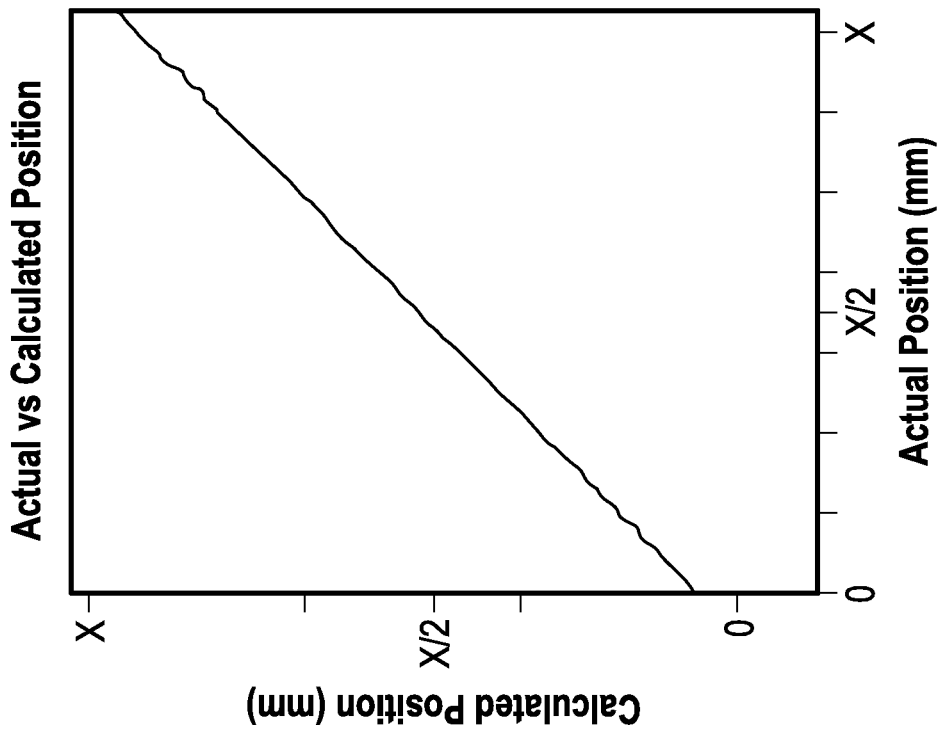

FIGS. 3A-3D illustrate examples of the disparity between actual position and calculated position as a stylus moves along one axis of a touch sensor panel according to examples of the disclosure. FIG. 3A illustrates a plot of the calculated position of the stylus versus the actual position of the stylus when calculating position by taking a weighted centroid including all electrodes along a given axis. In an ideal case, where calculated position and actual position are the same, the plot can be a straight line at a 45 degree angle. However, because of non-idealities in the coupling between the stylus and the touch sensor panel and the algorithm used to calculate stylus position, there can be non-ideal results that can appear as a wobble in the plot of FIG. 3A as the stylus moves between electrodes along an axis. In other words, the signal coupling between the stylus and touch sensor panel and the calculated position metric can introduce an error in calculated position (discrepancy with actual position) that can cause a wobble to be displayed when plotting the actual versus calculated position.

Some of the calculated position error can be systematic error due to the number of electrodes on either side of the electrode nearest to the stylus. For example, when the stylus is at the midpoint of the x-axis of the touch sensor panel, i.e. at x=X/2, there can be an equal number of touch nodes on either side contributing to the weighted centroid calculation, and as a result there can be zero systematic error introduced. When the stylus is close to x=0, however, there can be more electrodes receiving signal on the right-hand side of the stylus and as a result, there can be a systematic error that causes the position to be calculated more to the right than the actual position. As a result, the error in position, defined as $x_{actual} - x_{measured}$, can be negative when the stylus is closer to x=0. On the other hand, when the stylus is closer to x=X, there can be more electrodes receiving signal on the left-hand side of the stylus and as a result, there can be a systematic error that causes the position to be measured more to the left. Thus, the error in position can be positive when the stylus is close to x=X.

FIG. 3B illustrates a plot of the error in position calculation versus the actual position when calculating position by taking a weighted centroid including all electrodes along a given axis. The slope of the error plot can be representative of the systematic error. As discussed above, the error can be generally negative between x=0 and x<X/2, can be zero at x=X/2, and can be positive between x>X/2 and X. The oscillation of the error plot can be representative of the wobble due to remaining error in calculated position.

Figure 3D:
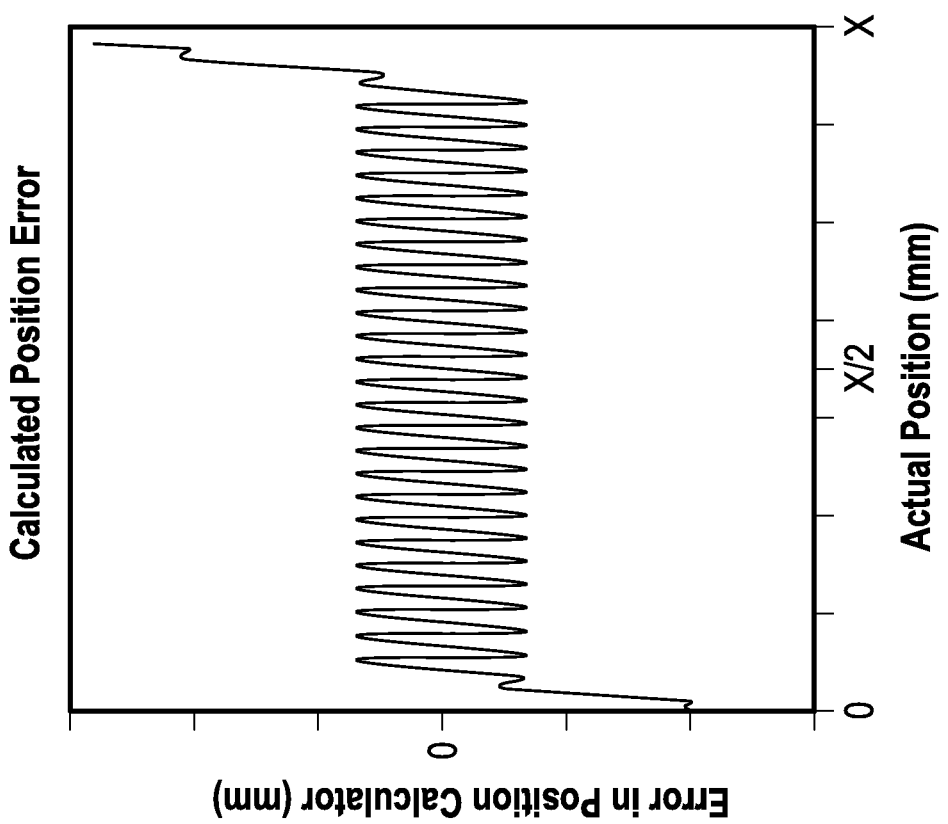
Figure 3C:
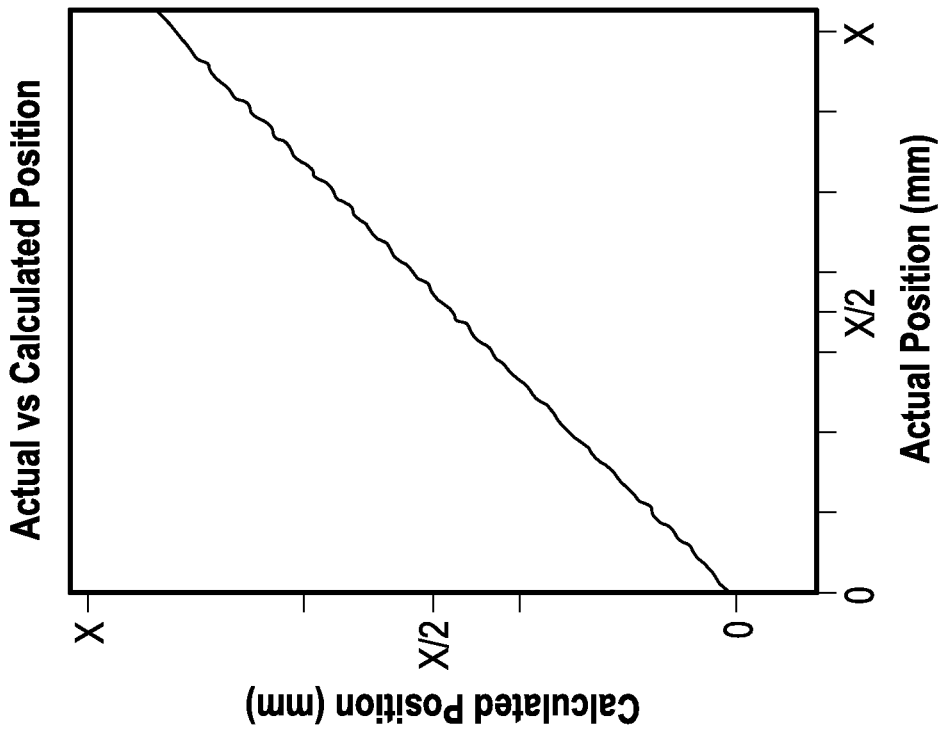

FIGS. 3C and 3D illustrate a plot of the calculated position versus the actual position and a plot of the error in position calculation versus the actual position when calculating position by taking a weighted centroid including a subset of the electrodes (e.g. five electrodes) along a given axis. As in FIGS. 3A and 3B, the plot in FIGS. 3C and 3D illustrate both a wobble and systematic error. Unlike FIG. 3B, the systematic error of FIG. 3D can be confined to the edges of the plot corresponding to the edges of the touch sensor panel and can be absent in the center of the error plot corresponding to the center of the touch sensor panel because in the center of the touch panel there can be an equal number of electrodes of the subset considered in calculating the weighted centroid on either side of the electrode nearest to the stylus. Additionally, the wobble can be greater (i.e. larger discrepancy between calculated position and actual position) when considering fewer electrodes for the weighted centroid calculation as illustrated by comparing the plots in FIGS. 3C and 3D using only a subset of electrodes with those in FIGS. 3A and 3B which use all of the electrodes of the touch sensor panel.

Although FIGS. 3A-3D are described with reference to the x-axis, similar effects can be observed when moving the stylus across the touch sensor panel along on the y-axis.

As discussed above, the signal coupling between the stylus and electrodes of the touch sensor panel can impact the calculation of the position of a stylus touching or hovering over the touch sensor panel. A signal profile can be formed for a given stylus and touch sensor panel. For example, the pitch of the touch sensor panel and the shape of the stylus tip can change the signal profile. In some examples, the signal profile can be non-linear such that the signal amplitude can be inversely proportional with the square of the distance between the stylus and the electrode. In other examples, the signal profile can be inversely proportional with the sum of the square of the distance between the stylus and the electrode and the square of a fitting parameter. FIGS. 4A-4C illustrate exemplary signal profiles for a stylus proximate to a touch sensor panel according to examples of the disclosure.

FIG. 4A illustrates a signal profile 400 of a stylus 402 positioned on a touch screen over a central electrode 404. The central electrode, electrode n 404, can be the electrode that receives the largest amplitude signal, $S_n$ 406. Electrode n+1 408 can be the electrode that receives the second largest amplitude signal, $S_{n+1}$ 410. For the signal profile illustrated in FIGS. 4A-4C, for example, electrode n+1 408 can be the electrode adjacent to electrode n 404. In the example of FIG. 4A, electrode n+1 408 can be the electrode to the right of electrode n 404 and each electrode continuing to the right can be numbered sequentially as n+2, n+3 . . . n+m, although FIG. 4A only illustrates five electrodes. The electrode adjacent to the central electrode 404, but on the opposite side of electrode n+1 408, can be electrode n−1 412. In the example of FIG. 4A, electrode n−1 412 can be the electrode to the left of electrode n 404 and each electrode continuing to the left can be numbered sequentially as n−2, n−3 . . . n−k, although FIG. 4A only illustrates five electrodes. The signal profile 400 can be non-linear, such that electrode n 404 (e.g. the electrode most proximate to the stylus) receives the largest amplitude signal 406 and the signal diminishes for each electrode as the distance increases from the central electrode 404, in a non-linear fashion. Thus, due to the non-linear signal profile, the amplitude drops sharply as the distance from the stylus to a given electrode increases.

FIG. 4B illustrates a signal profile 420 of a stylus 402 positioned on a touch screen less than half the pitch distance between two adjacent electrodes. Central electrode, electrode n 404, can be the electrode that receives the largest amplitude signal 406. Electrode n+1 408 can be the electrode that receives the second largest amplitude signal, $S_{n+1}$ 410. As in FIG. 4A, electrode n+1 408 in FIG. 4B can be the electrode to the right of electrode n 404 and each electrode continuing to the right can be numbered sequentially as n+2, n+3 . . . n+m, although FIG. 4B only illustrates five electrodes. In the example of FIG. 4B, electrode n−1 412 can be the electrode to the left of electrode n 404 and each electrode continuing to the left can be numbered sequentially as n−2, n−3 . . . n−k, although FIG. 4B only illustrates five electrodes.

FIG. 4C illustrates a signal profile 430 of a stylus 402 positioned on a touch screen less than half the pitch distance between two adjacent electrodes, but on the opposite side of the central electrode 404 illustrated in FIG. 4B. Central electrode, electrode n 404, can be the electrode that receives the largest amplitude signal 406. Electrode n+1 408 can be the electrode that receives the second largest amplitude signal, $S_{n+1}$ 410. Electrode n+1 408 in FIG. 4C can be the electrode to the left of electrode n 404 and each electrode continuing to the left can be numbered sequentially as n+2, n+3 . . . n+m, although FIG. 4C only illustrates five electrodes. In the example of FIG. 4C, electrode n−1 412 can be the electrode to the right of electrode n 404 and each electrode continuing to the right can be numbered sequentially as n−2, n−3 . . . n−k, although FIG. 4C only illustrates five electrodes.

As illustrated in FIGS. 4B and 4C, the movement of the stylus can be symmetric to either side of the central electrode 404 with the largest signal amplitude. Thus, for example, the stylus moving to the right of the central electrode 404 in FIG. 4B and the stylus moving to the left of the central electrode 404 in FIG. 4C, can have symmetric signal profiles.

Various metrics can be used to determine the location of a stylus based on the signal profile of the stylus and touch sensor panel. For example, location can be determined by looking at the ratio of the largest and second largest signal amplitudes, or $S_n/S_{n+1}$. Alternatively, the ratio of the signal amplitudes of the side lobes, can be used to determine location. In other examples, an n-point centroid can be calculated. For example, in a 3-point centroid, the location can be determined based on $(-S_{n-1}+S_{n+1})/(S_{n-1}+S_n+S_{n+1})$. In a 4-point centroid, the location can be determined based on either $(-S_{n-2}-S_{n-1}+S_{n+1})/(S_{n-2}+S_{n-1}+S_n+S_{n+1}+S_{n+2})$ or $(-S_{n-1}+S_{n+1}+S_{n+2})/(S_{n-2}+S_{n-1}+S_n+S_{n+1}+S_{n+2})$.

The various metrics can have different performance characteristics and can be evaluated based on the wobble (cause by positional inaccuracy) and dots per inch (DPI) resolution associated with a given metric across a pitch distance. DPI resolution can be a measurement of jitter of position measurement. It can be desirable to calculate position using a metric that exhibits sufficient DPI resolution regardless of stylus position, i.e. for the entire pitch distance. In some examples, the DPI resolution can be determined by the resolution discernable by a user. In some examples the DPI resolution minimum can be between 300 and 400 DPI.

Figure 5:
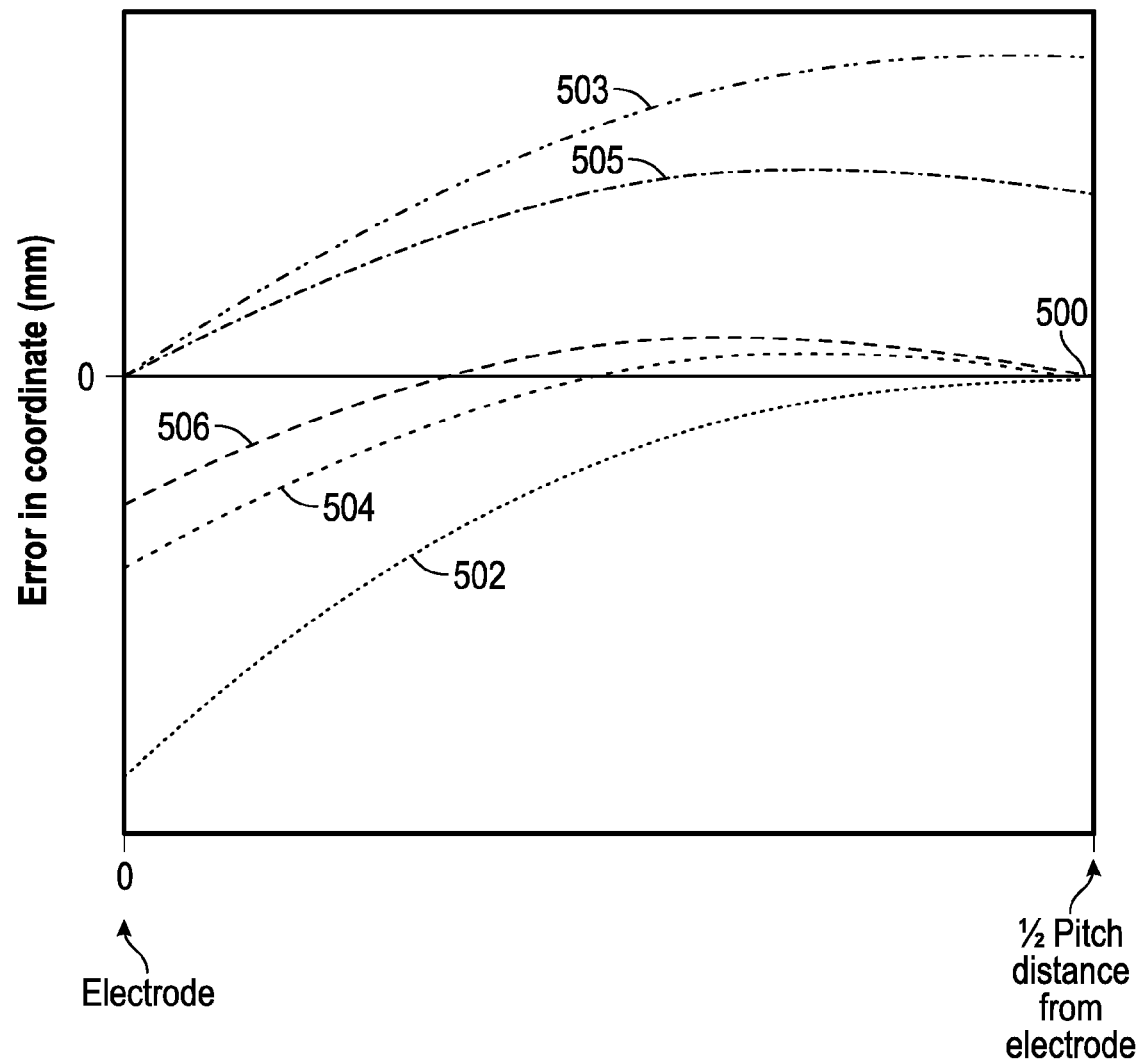
FIG. 5 illustrates exemplary wobble associated with various position calculation metrics under low noise conditions according to examples of the disclosure.

FIG. 5 illustrates exemplary wobble associated with various metrics in a low noise condition according to examples of the disclosure. Ratio based metrics, such as ratio of the two largest signal amplitudes, $S_n/S_{n+1}$, and the ratio of the side lobes, $S_{n-1}/S_{n+1}$, for example, can have little or no wobble in a low noise condition as illustrated by curve 500, but can be more sensitive to noise and therefore can have higher jitter at certain locations which can reduce the DPI resolution of touch screen. In contrast, a centroid based metric can have improved noise immunity (i.e. minimal reduction in DPI resolution) when compared with ratio based metrics, but can introduce wobble as shown in curves 502, 503, 504, 505 and 506, corresponding to 2-point, 3-point, 4-point, 5-point and 6-point centroids. As illustrated in FIG. 5, the number of electrodes considered in the centroid calculation can change the degree of wobble. For example, a 6-point centroid can have less wobble than a 2-point centroid. Likewise, a 5-point centroid can have less wobble than a 3-point centroid. Considering more electrodes in the centroid, however, can introduce more systematic error and reduce DPI resolution, whereas considering fewer electrodes can reduce systematic error and increase DPI resolution. Additionally, odd-point centroids, such as a 3-point centroid illustrated by curve 503 or a 5-point centroid illustrated by curve 505 can have little or no error in coordinate measurements when a stylus touches a touch screen at a point directly above an electrode, but can have considerable error in coordinate measurement when a stylus touches a touch screen at a point in between two electrodes, e.g. at half the pitch distance. Likewise, even-point centroids, such as a 2-point centroid illustrated by curve 502 or a 4-point centroid illustrated by curve 504 can have little or no error in coordinate measurements when a stylus touches a touch screen at a point in between two electrodes, e.g. at half the pitch distance, but can have considerable error in coordinate measurement when a stylus touches a touch screen at a point directly above an electrode.

Figure 6:
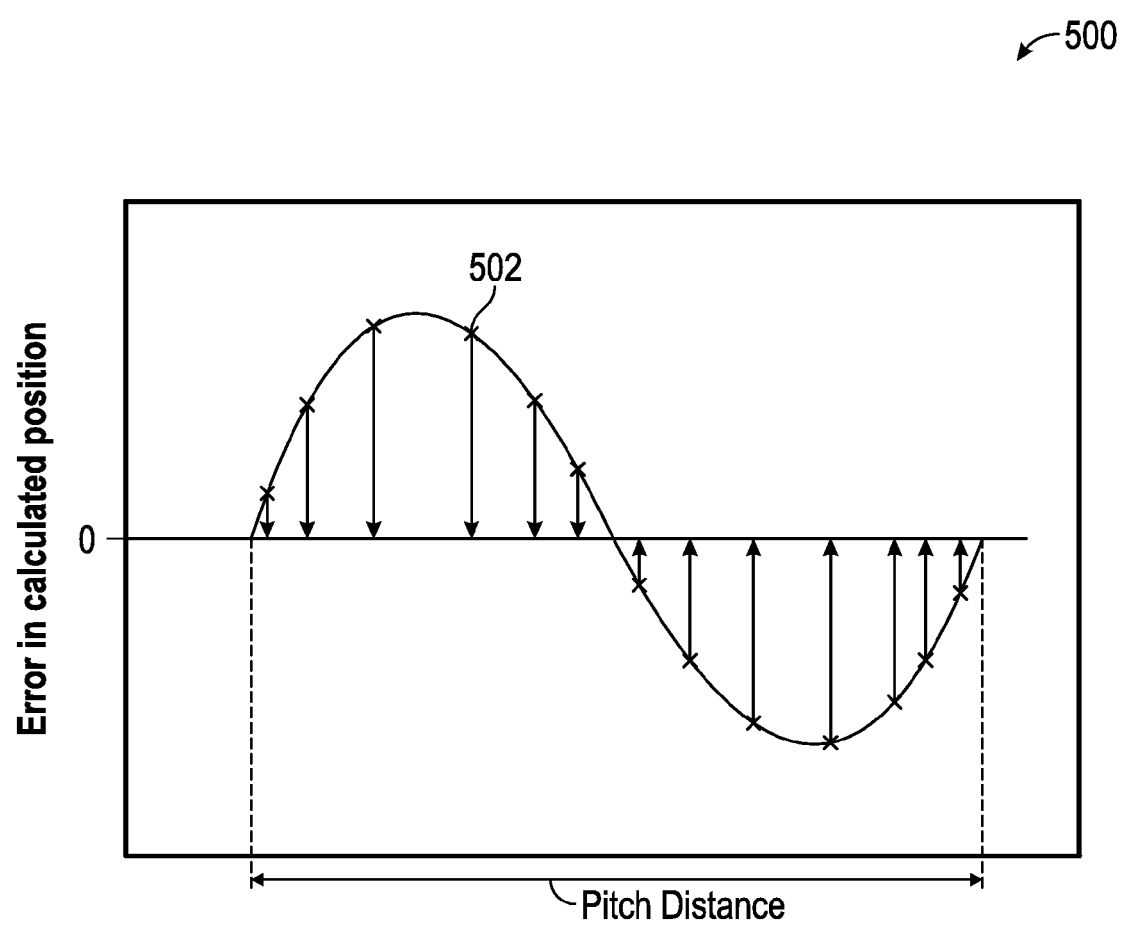
FIG. 6 illustrates an exemplary LUT based correction method according to examples of the disclosure.

In some examples, a look-up table (LUT) based correction algorithm can be used to improve the accuracy of coordinate calculations, and thereby reduce or remove wobble. For a given stylus-tip/touch sensor panel signal profile, correction values can be calculated and stored in a LUT. This LUT can be used to correct calculations from a centroid-based measurement of position, for example. FIG. 6 illustrates an exemplary LUT based correction method according to examples of the disclosure. For example, plot 600 shows the error in calculated position versus the actual position between two electrodes separated by a pitch distance. For discrete actual positions between the two electrodes, the error in calculated position can be stored and subtracted from the calculated position to remove the error. For example, the error in calculated position at a discrete point 602 can be subtracted from the calculated position in order to correct for the error (i.e. such that the error in calculated position becomes substantially zero). In other examples, rather than subtracting the error from the calculated position, the LUT can directly map the calculated position to a corrected calculated position. Using a LUT-based correction method can reduce wobble, such that accuracy of centroid based metrics can be comparable with ratio based metrics. Using a LUT, however, can reduce DPI resolution.

In other examples, a weighted combination of two position calculation metrics can be used to reduce wobble. As discussed above and illustrated in FIG. 5, an even-point centroid can have little or no error in coordinate measurements when a stylus touches a touch screen at a point between two electrodes, but can have considerable error in coordinate measurement when a stylus touches a touch screen at a point above an electrode, whereas an odd-point centroid can have little or no error in coordinate measurements when a stylus touches a touch screen at a point above an electrode, but can have considerable error in coordinate measurement when a stylus touches a touch screen at a point in between two electrodes. Thus, a weighted combination of even-point and odd-point centroids can be used to take advantage of the respective accuracy of even-point and odd-point centroids based on the location of the stylus. Mathematically, the calculated position using a weighted combination of even-point and odd-point centroids can be expressed as show in equation 2:

$$position = \frac{W_{odd}C_{odd} + W_{even}C_{even}}{W_{odd} + W_{even}} \quad (2)$$

where $W_{odd}$ can be the weighting for the odd-point centroid, $C_{odd}$ can be the odd-point centroid calculation, $W_{even}$ can be the weighting for the even-point centroid, $C_{even}$ can be the even-point centroid calculation.

In some example, a single-point transition can be made between using an odd-point centroid calculation and an even point centroid calculation. The single-point transition can be defined such that the odd-point centroid measurement can be used when the stylus touches a touch screen at a point above an electrode and the even-point centroid can be used as the stylus moves away from an electrode, i.e. when the stylus touches a touch screen at a point between the two electrodes. In some examples, the ratio of the side lobes can be used to define the transition point. For examples, for the signal profile illustrated in FIG. 4A, the ratio of the side lobes, $S_{n-1}/S_{n+1}$, can be close to 1 when the stylus touches a touch screen at a point above a central electrode. As a result, the odd-point centroid can be used when the ratio of the side lobes is within a threshold distance of 1, i.e. by setting $W_{odd}$ to 1 and $W_{even}$ to 0 when the stylus touches a touch screen at a point near an electrode, and otherwise using the even-point centroid, i.e. by setting $W_{odd}$ to 0 and $W_{even}$ to 1 when the stylus touches a touch screen at a point between two electrodes. Although described above as a single-point transition between an odd-point centroid and an even point centroid, the odd-point and even-point centroids can be replaced with other position calculation metrics. A single-point transition between odd-point and even-point centroids can reduce wobble by using the respective metrics when they can be most accurate. A single-point transition, however, can reduce DPI resolution around the transition point because at that point the calculation metric can instantaneously switch between the odd-point and even-point centroid.

In other examples, the weighted combination can be a linear combination of odd-point and even point centroid calculations, rather than using a single transition point. For example, $W_{odd}$ and $W_{even}$ can be defined as shown in equations 3 and 4:

$$W_{odd} = \alpha\left(\frac{S_n}{S_{n+1}} - 1\right) \quad (3)$$

$$W_{even} = \beta\left(\frac{S_{n-1}}{S_{n+1}} - 1\right) \quad (4)$$

where α and β can be scaling parameters, $S_{n-1}/S_{n+1}$ can be the ratio of the side lobes and $S_n/S_{n+1}$ can be the ratio of the largest and second largest signal amplitudes.

As discussed above, the ratio of the side lobes can be 1 when the stylus touches a touch screen at a point above an electrode and therefore $W_{even}$ can approach zero under this condition. Accordingly, the contribution of the even-point centroid, which can have relatively large error in calculated position when the stylus touches a touch screen at a point above the electrode, can be minimized or substantially zero. As shown in FIGS. 4B and 4C, $S_n/S_{n+1}$, the ratio of the largest and second largest signal amplitudes, can be 1 when the stylus touches a touch screen at a point at half the pitch distance between two electrodes. Therefore $W_{odd}$ can approach zero when the odd-point centroid under this condition. Accordingly, the contribution of the odd-point centroid, which can have relatively large error when the stylus touches a touch screen at a point between two electrodes, can be minimized or substantially zero.

In some examples, coefficients α and β can be defined by a polynomial of a single variable. For example, α can be a polynomial $a_1+b_1x+c_1x^2+ \ldots$ and β can be a polynomial $a_2+b_2x+c_2x^2+ \ldots$ where the variable x can be defined, for example, by $(S_n/S_{n+1})/(S_n/S_{n+1})_{max}$. In some examples, a higher order polynomial can be used to reduce wobble more than lower order polynomials, but increasing the order of the polynomial can create more susceptibility to noise, thereby reducing DPI resolution.

Although described above as a weighted combination of an odd-point centroid and an even point centroid, the odd-point and even-point centroids can be replaced with other position calculation metrics.

Figure 7:
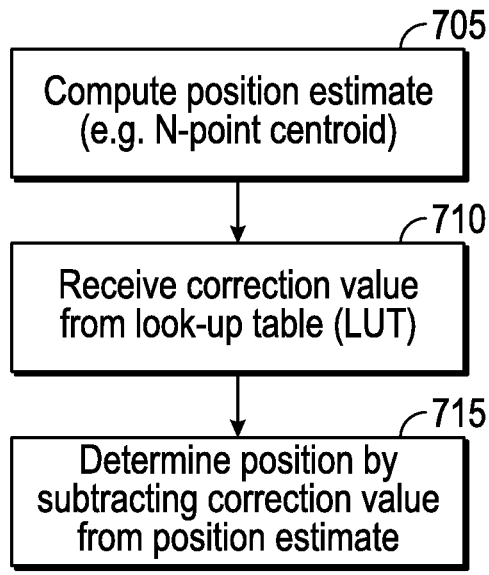
FIG. 7 illustrates an exemplary algorithm for reducing stylus tip wobble using a LUT according to examples of the disclosure.

FIG. 7 illustrates an exemplary algorithm for reducing stylus tip wobble using a LUT according to examples of the disclosure. The system can compute an estimate of the position of a stylus (705). In some examples the position estimated can be computed using an n-point centroid, although in other examples, other position calculation metrics are possible. The system can receive a correction value from a LUT (710). The LUT correction value can correspond to the error in the position associated with the position estimate at 705 for the given position calculation metric and signal profile. The system can determine the stylus position by subtracting the correction value from the position estimate (715). As described above, in other examples, the LUT can map the position estimate to an updated position estimate without having to subtract the correction value from the position estimated value.

Figure 8:
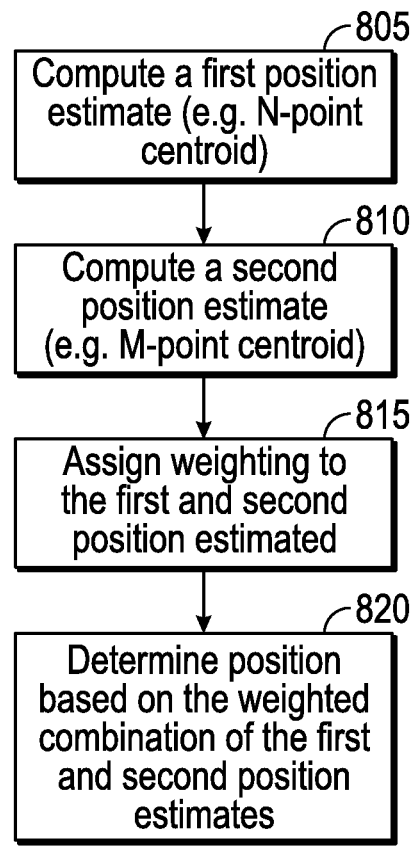
FIG. 8 illustrates an exemplary algorithm for reducing stylus tip wobble using a weighted combination of two position estimates according to examples of the disclosure.

FIG. 8 illustrates an exemplary algorithm for reducing stylus tip wobble using a weighted combination of two position estimates according to examples of the disclosure. The system can compute a first position estimate, e.g. an n-point centroid, for the position of a stylus (805). The system can compute a second position estimate, e.g. an m-point centroid, for the position of a stylus (810). In some examples, the first position estimate can be an odd-point centroid and second position estimate can be an even-point centroid. The system can assign weighting to the first and second position estimates (815). The system can determine the stylus position based on the weighted combination of the first and second position estimates (820). Although illustrated and described as calculating first and second centroids, other position calculation metrics can also be used instead.

Figure 9A:
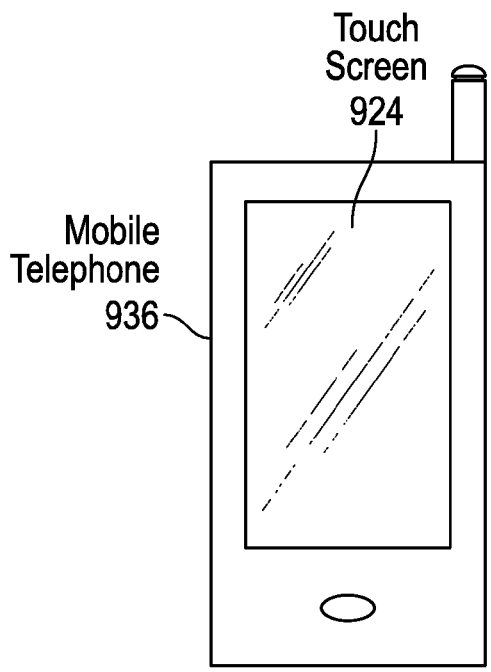
FIGS. 9A-9D illustrate example systems in which the algorithm for reducing stylus tip wobble according to examples of the disclosure can be implemented.
Figure 9B:
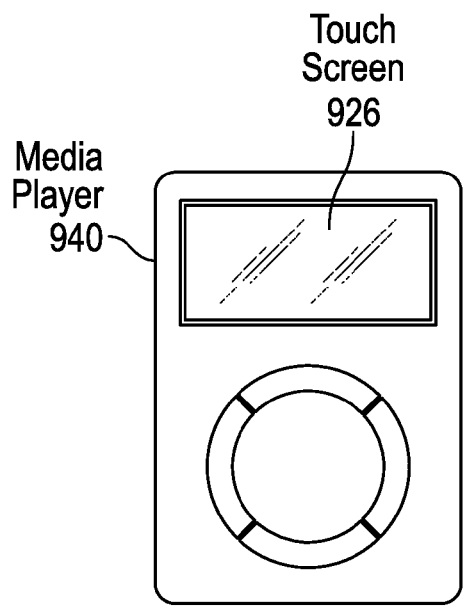
Figure 9C:
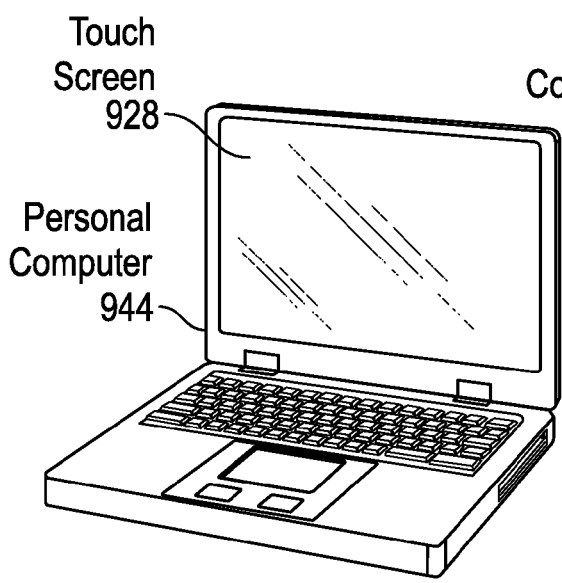
Figure 9D:
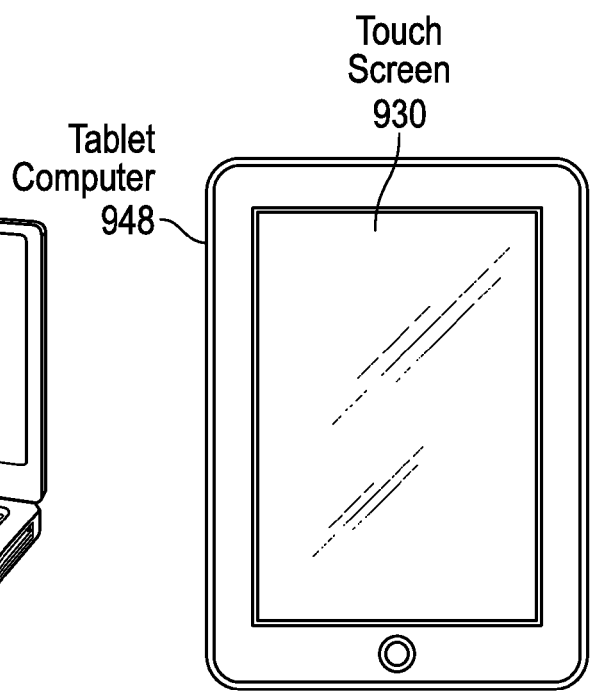

FIGS. 9A-9D illustrate example systems in which the algorithm for reducing stylus tip wobble according to examples of the disclosure can be implemented. FIG. 9A illustrates an example mobile telephone 936 that includes a touch screen 924 and other computing system blocks that can implement the algorithm for reducing stylus tip wobble according to various examples. FIG. 9B illustrates an example digital media player 940 that includes a touch screen 926 and other computing system blocks that can implement the algorithm for reducing stylus tip wobble according to various examples. FIG. 9C illustrates an example personal computer 944 that includes a touch screen 928 and other computing system blocks that can implement the algorithm for reducing stylus tip wobble according to various examples. FIG. 9D illustrates an example tablet computing device 948 that includes a touch screen 930 and other computing system blocks that can implement the algorithm for reducing stylus tip wobble according to various examples. The touch screen and computing system blocks that can implement the algorithm for reducing stylus tip wobble can be implemented in other devices including in wearable devices.

Therefore, according to the above, some examples of the disclosure are directed to a method for reducing wobble in a calculated position of a stylus. The method can comprise determining a first position estimate along an axis using a first position calculation, determining a second position estimate along the axis using a second position calculation, assigning weighting to the first and second calculated position estimates based on a proximity of the stylus to an electrode, and determining the calculated position of the stylus based on a weighted combination of the first and second position estimates. Additionally or alternatively to one or more examples disclosed above, the first position calculation can be an odd-point centroid using signal measurements from an odd number of electrodes. Additionally or alternatively to one or more examples disclosed above, the second position calculation can be an even-point centroid using signal measurements from an even number of electrodes. Additionally or alternatively to one or more examples disclosed above, the method can further comprise calculating a ratio of a second largest amplitude signal and a third largest amplitude signal and assigning full weight to the first position estimate and zero weight to the second position estimate if the ratio of the second largest amplitude signal and the third largest amplitude signal is within a threshold value of unity. Additionally or alternatively to one or more examples disclosed above, the method can further comprise assigning zero weight to the first position estimate and full weight to the second position estimate if the ratio of the second largest amplitude signal and the third largest amplitude signal is more than a threshold value from unity. Additionally or alternatively to one or more examples disclosed above, the method can further comprise calculating a first ratio of a second largest amplitude signal and a third largest amplitude signal, calculating a second ratio of a largest amplitude signal and the second largest amplitude signal, and determining the proximity of the stylus to an electrode based on at least one of the first or second ratios. Additionally or alternatively to one or more examples disclosed above, the first position estimate can be weighted based on the ratio of the largest amplitude signal and the second largest amplitude signal. Additionally or alternatively to one or more examples disclosed above, the second position estimate can be weighted based on the ratio of the second largest amplitude signal and the third largest amplitude signal. Additionally or alternatively to one or more examples disclosed above, the first and second positions estimates can be further weighted based on one or more polynomial coefficients. Additionally or alternatively to one or more examples disclosed above, the method can further comprise correcting the calculated position of the stylus based on one or more values from a look-up-table (LUT).

Other examples of the disclosure are directed to a system for improving accuracy in a stylus measurement. The system can comprise a plurality of electrodes arranged along an axis capable of receiving a plurality of signals and one or more processors capable of determining a first position estimate along an axis using a first position calculation, determining a second position estimate along the axis using a second position calculation, assigning weighting to the first and second calculated position estimates based on a proximity of the stylus to an electrode of the plurality of electrodes, and determining the calculated position of the stylus based on a weighted combination of the first and second position estimates. Additionally or alternatively to one or more examples disclosed above, the first position calculation can be an odd-point centroid using signal measurements from an odd number of electrodes. Additionally or alternatively to one or more examples disclosed above, the second position calculation can be an even-point centroid using signal measurements from an even number of electrodes. Additionally or alternatively to one or more examples disclosed above, assigning weighting to the first and second calculated position estimates can further comprise calculating a ratio of a second largest amplitude signal and a third largest amplitude signal, and assigning full weight to the first position estimate and zero weight to the second position estimate if the ratio of the second largest amplitude signal and the third largest amplitude signal is within a threshold value of unity. Additionally or alternatively to one or more examples disclosed above, assigning weighting to the first and second calculated position estimates can further comprise assigning zero weight to the first position estimate and full weight to the second position estimate if the ratio of the second largest amplitude signal and the third largest amplitude signal is more than a threshold value from unity. Additionally or alternatively to one or more examples disclosed above, the processor can further be capable of calculating a first ratio of a second largest amplitude signal and a third largest amplitude signal, calculating a second ratio of a largest amplitude signal and the second largest amplitude signal, and determining the proximity of the stylus to an electrode based on at least one of the first or second ratios. Additionally or alternatively to one or more examples disclosed above, the first position estimate can be weighted based on the ratio of the largest amplitude signal and the second largest amplitude signal. Additionally or alternatively to one or more examples disclosed above, the second position estimate can be weighted based on the ratio of the second largest amplitude signal and the third largest amplitude signal. Additionally or alternatively to one or more examples disclosed above, the first and second positions estimates can be further weighted based on one or more polynomial coefficients. Additionally or alternatively to one or more examples disclosed above, the one or more processors can be further capable of correcting the calculated position of the stylus based on one or more values from a look-up-table (LUT).

Other examples of the disclosure are directed to a non-transitory computer readable storage medium. The computer readable storage medium can contain instructions that, when executed, perform a stylus position error correction method. The method can comprise determining a first position estimate along an axis using a first position calculation, determining a second position estimate along the axis using a second position calculation, assigning weighting to the first and second calculated position estimates based on a proximity of the stylus to an electrode, and determining a calculated position of the stylus based on a weighted combination of the first and second position estimates. Additionally or alternatively to one or more examples disclosed above, the first position calculation can be an odd-point centroid using signal measurements from an odd number of electrodes and the second position calculation can be an even-point centroid using signal measurements from an even number of electrodes. Additionally or alternatively to one or more examples disclosed above, assigning weighting to the first and second calculated position estimates can comprise calculating a ratio of a second largest amplitude signal and a third largest amplitude signal, and assigning full weight to the first position estimate and zero weight to the second position estimate if the ratio of the second largest amplitude signal and the third largest amplitude signal is within a threshold value of unity, and assigning zero weight to the first position estimate and full weight to the second position estimate if the ratio of the second largest amplitude signal and the third largest amplitude signal is more than a threshold value from unity. Additionally or alternatively to one or more examples disclosed above, the method can further comprise calculating a first ratio of a second largest amplitude signal and a third largest amplitude signal, calculating a second ratio of a largest amplitude signal and the second largest amplitude signal, and determining the proximity of the stylus to an electrode based on at least one of the first or second ratios. Additionally or alternatively to one or more examples disclosed above, the first position estimate can be weighted based on the ratio of the largest amplitude signal and the second largest amplitude signal and the second position estimate can be weighted based on the ratio of the second largest amplitude signal and the third largest amplitude signal.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the appended claims.

What is claimed is:

1. A method for reducing wobble in a calculated position of a stylus, the method comprising:
   determining a first position estimate along an axis of a touch sensor panel using a first position calculation;
   determining a second position estimate along the axis of the touch sensor panel using a second position calculation;
   calculating a ratio of a second largest amplitude signal and a third largest amplitude signal;
   assigning weighting to the first and second calculated position estimates based on a proximity of the stylus to an electrode receiving a largest amplitude signal, wherein full weight is assigned to the first position estimate and zero weight is assigned to the second position estimate when the ratio of the second largest amplitude signal and the third largest amplitude signal is within a threshold value of unity;
   determining the calculated position of the stylus based on a weighted combination of the first and second position estimates; and
   updating a user interface according to the calculated position, wherein the user interface is displayed on a display device coupled to the touch sensor panel.

2. The method of claim 1, wherein the first position calculation is an odd-point centroid using signal measurements from an odd number of electrodes of the touch sensor panel.

3. The method of claim 1, wherein the second position calculation is an even-point centroid using signal measurements from an even number of electrodes of the touch sensor panel.

4. The method of claim 1, further comprising:
   assigning zero weight to the first position estimate and full weight to the second position estimate when the ratio of the second largest amplitude signal and the third largest amplitude signal is more than the threshold value from unity.

5. The method of claim 1, further comprising correcting the calculated position of the stylus based on one or more values from a look-up-table (LUT).

6. A method for reducing wobble in a calculated position of a stylus comprising:
   determining a first position estimate along an axis of a touch sensor panel using a first position calculation;
   determining a second position estimate along the axis of the touch sensor panel using a second position calculation;
   calculating a first ratio of a second largest amplitude signal and a third largest amplitude signal;
   calculating a second ratio of a largest amplitude signal and the second largest amplitude signal;
   determining the proximity of the stylus to an electrode receiving the largest amplitude signal based on at least one of the first or second ratios;
   assigning weighting to the first and second calculated position estimates based on the determined proximity of the stylus to the electrode receiving the largest amplitude signal, wherein the first position estimate is weighted based on the ratio of the largest amplitude signal and the second largest amplitude signal;
   determining the calculated position of the stylus based on a weighted combination of the first and second position estimates; and
   updating a user interface according to the calculated position, wherein the user interface is displayed on a display device coupled to the touch sensor panel.

7. The method of claim 6, wherein the second position estimate is weighted based on the ratio of the second largest amplitude signal and the third largest amplitude signal.

8. The method of claim 7, wherein the first and second positions estimates are further weighted based on one or more polynomial coefficients.

9. A system for improving accuracy in a stylus measurement, comprising:
   a plurality of electrodes arranged along an axis of a touch sensor panel capable of receiving a plurality of signals;
   a display device coupled to the touch sensor panel; and
   one or more processors capable of:
      determining a first position estimate along the axis of the touch sensor panel using a first position calculation;
      determining a second position estimate along the axis of the touch sensor panel using a second position calculation;
      calculating a ratio of a second largest amplitude signal and a third largest amplitude signal;
      assigning weighting to the first and second calculated position estimates based on a proximity of the stylus to an electrode of the plurality of electrodes receiving a largest amplitude signal, wherein full weight is assigned to the first position estimate and zero weight is assigned to the second position estimate when the ratio of the second largest amplitude signal and the third largest amplitude signal is within a threshold value of unity;
      determining the calculated position of the stylus based on a weighted combination of the first and second position estimates; and updating a user interface according to the calculated position, wherein the user interface is displayed on the display device.

10. The system of claim 9, wherein the first position calculation is an odd-point centroid using signal measurements from an odd number of electrodes of the touch sensor panel.

11. The system of claim 9, wherein the second position calculation is an even-point centroid using signal measurements from an even number of electrodes of the touch sensor panel.

12. The system of claim 9, wherein assigning weighting to the first and second calculated position estimates further comprises:
assigning zero weight to the first position estimate and full weight to the second position estimate when the ratio of the second largest amplitude signal and the third largest amplitude signal is more than the threshold value from unity.

13. The system of claim 9, the one or more processors further capable of correcting the calculated position of the stylus based on one or more values from a look-up-table (LUT).

14. A system for improving accuracy in a stylus measurement, comprising:
a plurality of electrodes arranged along an axis of a touch sensor panel capable of receiving a plurality of signals;
a display device coupled to the touch sensor panel; and
one or more processors capable of:
determining a first position estimate along the axis of the touch sensor panel using a first position calculation;
determining a second position estimate along the axis of the touch sensor panel using a second position calculation;
calculating a first ratio of a second largest amplitude signal and a third largest amplitude signal;
calculating a second ratio of a largest amplitude signal and the second largest amplitude signal;
determining the proximity of the stylus to the electrode receiving the largest amplitude signal based on at least one of the first or second ratios;
assigning weighting to the first and second calculated position estimates based on the determined proximity of the stylus to the electrode receiving the largest amplitude signal, wherein the first position estimate is weighted based on the ratio of the largest amplitude signal and the second largest amplitude signal;
determining the calculated position of the stylus based on a weighted combination of the first and second position estimates; and
updating a user interface according to the calculated position, wherein the user interface is displayed on the display device.

15. The system of claim 14, wherein the second position estimate is weighted based on the ratio of the second largest amplitude signal and the third largest amplitude signal.

16. The system of claim 15, wherein the first and second positions estimates are further weighted based on one or more polynomial coefficients.

17. A non-transitory computer readable storage medium, the computer readable storage medium containing instructions that, when executed, perform a stylus position error correction method, the method comprising:
determining a first position estimate along an axis of a touch sensor panel using a first position calculation;
determining a second position estimate along the axis of the touch sensor panel using a second position calculation;
calculating a ratio of a second largest amplitude signal and a third largest amplitude signal;
assigning weighting to the first and second calculated position estimates based on a proximity of the stylus to an electrode receiving a largest amplitude signal, wherein full weight is assigned to the first position estimate and zero weight is assigned to the second position estimate when the ratio of the second largest amplitude signal and the third largest amplitude signal is within a threshold value of unity;
determining a calculated position of the stylus based on a weighted combination of the first and second position estimates; and
updating a user interface according to the calculated position, wherein the user interface is displayed on a display device coupled to the touch sensor panel.

18. The non-transitory computer readable storage medium of claim 17, wherein the first position calculation is an odd-point centroid using signal measurements from an odd number of electrodes of the touch sensor panel and the second position calculation is an even-point centroid using signal measurements from an even number of electrodes of the touch sensor panel.

19. The non-transitory computer readable storage medium of claim 17, wherein assigning weighting to the first and second calculated position estimates comprises:
assigning zero weight to the first position estimate and full weight to the second position estimate when the ratio of the second largest amplitude signal and the third largest amplitude signal is more than a threshold value from unity.

20. A non-transitory computer readable storage medium, the computer readable storage medium containing instructions that, when executed, perform a stylus position error correction method, the method comprising:
determining a first position estimate along an axis of a touch sensor panel using a first position calculation;
determining a second position estimate along the axis of the touch sensor panel using a second position calculation;
calculating a first ratio of a second largest amplitude signal and a third largest amplitude signal;
calculating a second ratio of a largest amplitude signal and the second largest amplitude signal;
determining the proximity of the stylus to the electrode receiving the largest amplitude signal based on at least one of the first or second ratios;
assigning weighting to the first and second calculated position estimates based on the determined proximity of the stylus to the electrode receiving the largest amplitude signal, wherein the first position estimate is weighted based on the ratio of the largest amplitude signal and the second largest amplitude signal and the second position estimate is weighted based on the ratio of the second largest amplitude signal and the third largest amplitude signal;
determining the calculated position of the stylus based on a weighted combination of the first and second position estimates; and
updating a user interface according to the calculated position, wherein the user interface is displayed on a display device coupled to the touch sensor panel.

* * * * *